(12) United States Patent
Unquera et al.

(10) Patent No.: US 8,497,014 B2
(45) Date of Patent: Jul. 30, 2013

(54) HEAT TREATABLE COATED GLASS PANE

(75) Inventors: Javier Unquera, Halmstad (SE); John Andrew Ridealgh, Wincham (GB); John Robert Siddle, Southport (GB); Gary Robert Nichol, Warrington (GB)

(73) Assignee: Pilkington Group Limited, St. Helens, Merseyside (GB)

( * ) Notice: Subject to any disclaimer, the term of this patent is extended or adjusted under 35 U.S.C. 154(b) by 75 days.

(21) Appl. No.: 12/451,990

(22) PCT Filed: Jun. 27, 2008

(86) PCT No.: PCT/GB2008/050506
§ 371 (c)(1),
(2), (4) Date: Dec. 10, 2009

(87) PCT Pub. No.: WO2009/001143
PCT Pub. Date: Dec. 31, 2008

(65) Prior Publication Data
US 2010/0136365 A1    Jun. 3, 2010

(30) Foreign Application Priority Data
Jun. 27, 2007   (GB) .................................. 0712447.2

(51) Int. Cl.
*B32B 17/06*   (2006.01)
*B32B 15/04*   (2006.01)
*B32B 9/00*   (2006.01)
*C03C 17/36*   (2006.01)

(52) U.S. Cl.
USPC ............ 428/215; 428/623; 428/426; 428/432

(58) Field of Classification Search
USPC .......................................... 428/215, 336, 623
See application file for complete search history.

(56) References Cited

U.S. PATENT DOCUMENTS

| | | | |
|---|---|---|---|
| 5,296,302 A * | 3/1994 | O'Shaughnessy et al. ... | 428/472 |
| 5,935,702 A | 8/1999 | Macquart et al. | |
| 6,248,448 B1 * | 6/2001 | Lippey et al. .................. | 428/432 |
| 6,398,925 B1 * | 6/2002 | Arbab et al. .............. | 204/192.22 |
| 6,495,251 B1 * | 12/2002 | Arbab et al. ................... | 428/336 |
| 6,783,861 B2 * | 8/2004 | Ebisawa et al. ............... | 428/432 |
| 2003/0215622 A1 * | 11/2003 | MacQuart et al. ............ | 428/216 |
| 2006/0240266 A1 | 10/2006 | Schicht et al. | |
| 2008/0035300 A1 | 2/2008 | Beyer-Steinhauer et al. | |
| 2009/0169846 A1 * | 7/2009 | Siddle et al. .................. | 428/216 |
| 2009/0197077 A1 | 8/2009 | Reutler et al. | |

FOREIGN PATENT DOCUMENTS

| | | |
|---|---|---|
| EP | 1 147 066 B1 | 5/2003 |
| EP | 0 718 250 B1 | 7/2003 |
| EP | 1 140 721 B1 | 3/2004 |
| EP | 1 154 963 B1 | 9/2004 |
| EP | 1 644 296 A2 | 4/2006 |
| EP | 1 720 669 B1 | 5/2007 |
| EP | 1 529 761 B1 | 7/2009 |
| WO | WO 00/37379 | 6/2000 |
| WO | WO 2006/067102 A2 | 6/2006 |
| WO | WO 2007/080428 A1 | 7/2007 |
| WO | WO 2007/101964 A1 | 9/2007 |

* cited by examiner

*Primary Examiner* — David Sample
*Assistant Examiner* — Tahseen N Khan
(74) *Attorney, Agent, or Firm* — Marshall & Melhorn, LLC

(57) ABSTRACT

The invention relates to a coated glass pane with a low-e and/or solar controlcoating comprising—in sequence from the glass surface—at least the following layers: —a lower anti-reflection layer, comprising: a base layer of an (oxi)nitride of aluminum, a middle layer of an oxide of Zn and Sn, a top layer of a metal oxide; —a silver-based functional layer; —a barrier layer; —an upper anti-reflection layer comprising a layer of an (oxi)nitride of aluminum 10 having a thickness of more than 10 nm.

20 Claims, No Drawings

HEAT TREATABLE COATED GLASS PANE

The invention relates to heat treatable coated glass panes with a low-e and/or solar control coating.

BACKGROUND OF THE INVENTION

Heat treated glass panes which are toughened to impart safety properties and/or are bent are required for a large number of areas of application, for example for architectural or motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for several minutes before initiating the actual toughening and/or bending process.

"Heat treatment", "heat treated" and "heat treatable" in the following description and in the claims refer to thermal bending and/or toughening processes such as mentioned before and to other thermal processes during which a coated glass pane reaches temperatures in the range of about 580-690° C. for a period of several minutes, e.g., for up to about 10 minutes. A coated glass pane is deemed to be heat treatable if it survives a heat treatment without significant damage, typical damages caused by heat treatments being high haze values, pin holes or spots.

Difficulties can arise if glass panes are to be provided with coatings, particularly with coatings comprising at least one silver-based functional layer, e.g., to impart low-e and/or solar control properties to reduce the energy transfer through the coated glass pane in certain spectral regions. Such coatings are not of themselves heat treatable. Silver-based functional layers are usually embedded between lower and upper anti-reflection layers and, optionally, further auxiliary layers which protect them, modify the reflection and transmission characteristics of the coating, etc.

It would be desirable if coatings able to withstand heat treatments without significant damage (=heat treatable coatings) could be made available. It would be particularly desirable if heat treatable coatings able to withstand heat treatments without a significant change of their optical properties, e.g. light transmittance and reflection colour, as reflected in low $\Delta E^*$ values, could be made available.

EP 0 718 250 B1 discloses heat treatable coated glass panes with a low-e and/or solar control coating comprising a lower anti-reflection layer, a silver-based functional layer, a barrier layer and an outer anti-reflection layer, wherein the lower and upper anti-reflection layers each comprise partial layers having diffusion barrier properties and wherein the top partial layer of the lower anti-reflection layer comprises an oxide of Zn. While AlN is mentioned as a material for both partial layers having diffusion barrier properties, silicon compounds such as silicon nitride ($Si_3N_4$) or silicon oxinitride ($SiO_xN_y$) are disclosed as most preferred materials for these partial layers. The upper anti-reflection layer may comprise further partial layers of an oxide of Zn arranged below a silicon nitride layer. The metallic barrier layer protects the silver-based functional layer during the deposition of the preceding layers of the coating and during a subsequent heat treatment by capturing oxygen and thereby being partially or fully oxidized. According to the examples of the prior publication coated glass panes with coatings, the anti-reflection layers of which comprise partial layers of $Si_3N_4$ or $SiO_2$ as diffusion barriers, show only small changes of their light transmittance ($\Delta T_L$ at most 2%) and their reflection colour when heat treated at temperatures between 620 and 640° C. Known coated glass panes provide however of a less than optimum sheet resistance at a given thickness of the silver-based functional layer. Their production, specifically when using metallic barrier layers, is difficult to control and certain of the known coated glass panes show an unacceptably high damage level or an unacceptably low mechanical robustness after a heat treatment.

EP 1 154 963 B1 discloses heat treatable coated glass panes with a low-e and/or solar control coating comprising a lower anti-reflection layer, a silver-based functional layer, a barrier layer and an outer anti-reflection layer, wherein the lower and/or upper anti-reflection layers comprise partial layers of (oxi)nitrides of aluminium and of metal oxides, preferably of mixed oxides of Zn and Al. Barrier layers are provided on the silver-based functional layers which may be either metallic or suboxidic. The coatings are designed such that the light transmittance of a coated glass pane changes by at least 2.5% and preferably significantly more during a heat treatment. EP 1 154 963 B1 does not disclose heat treatable coated glass panes having stable optical properties, specifically a stable light transmittance, during a heat treatment. Coated glass panes according to EP 1 154 963 B1 display haze values of no less than 0.2% after a heat treatment.

EP 1 140 721 B1 discloses a method of sputtering barrier layers of metal-doped metal oxides such as Al-doped ZnO from metal-doped metal oxide targets, which barrier layers are to be arranged on top of the silver-based functional layer of certain low-e and/or solar control coatings. The lower anti-reflection layer of these coatings may comprise a base layer of an oxide of Zn and Sn and a top layer of ZnO, and the upper anti-reflection layer may comprise a layer of an oxide of Zn and Sn. At least some of the coated glass panes disclosed in EP 1 140 721 B1 are believed to be heat treatable and to show only small changes of their optical properties during a heat treatment. However it has been found that coatings of the type disclosed in this prior publication tend to be highly susceptible to visible haze formation during a heat treatment.

EP 1 644 296 A2 discloses heat treatable low-e and/or solar control coatings comprising an upper anti-reflection layer of a nitride such as $Si_3N_4$ covered by a final oxide layer and specifically discloses a coating of the layer sequence: glass/$Si_3N_4$/ZnO/Ag/opt. metal barrier/ZnO/$Si_3N_4$/metal oxide cover layer.

Heat treatable low-e and/or solar control coatings with a lower anti-reflection layer comprising an Al (oxi)nitride base layer and top layer of Al-doped ZnO and with an upper anti-reflection layer comprising an Al-doped ZnO layer and an outermost Al nitride layer are proposed by EP 1 147 066 B1. Further publications to be mentioned are EP 1 720 699 A2 and EP 1 529 761 A1.

SUMMARY OF THE INVENTION

The inventors of the instant invention found that several of the known heat treatable coated glass panes did not withstand without visible damage one or the other test simulating ordinary environmental influences during storage, transport and use of the coated glass panes before and after a heat treatment and the mechanical and chemical conditions acting on the coated glass panes during usual handling and processing steps. Many of the known heat treatable coated glass panes showed significant and clearly noticeable modifications of their optical properties during a heat treatment.

The invention primarily aims to provide heat treatable coated glass panes. The invention more particularly aims to provide heat treatable coated glass panes, the optical properties of which do not change significantly due to a heat treatment. Preferably the colour modification caused by a heat treatment should be so small that heat treated and non-heat treated coated glass panes may be glazed adjacent to each other without a noticeable colour difference.

The inventive heat treatable low-e and/or solar control coatings should withstand ordinary environmental influences during storage, transport and use of the coated glass panes both before and after a heat treatment and survive the mechanical and chemical conditions acting on the coated glass panes during usual handling and processing steps without significant damage.

The invention furthermore aims to provide heat treatable coated glass panes which either have a high light transmittance and a low emissivity (corresponding to a low sheet resistance) or which show good solar control properties, i.e. have a low solar energy transmittance combined with a sufficiently high light transmittance. The invention specifically aims at achieving a particularly low sheet resistance at a given thickness of the silver-based functional layer. Another aim is to keep the haze value of the heat treatable coated glass pane low, particularly below 0.2%, more preferably below 0.1%, even after a heat treatment.

The solution of one or more of the problems mentioned above is the subject of claim 1. Preferred embodiments are set out in the dependent claims.

DETAILED DESCRIPTION OF THE INVENTION

Surprisingly heat treatable coated glass panes with low-e and/or solar control coatings comprising at least one silver-based functional layer which in certain preferred embodiments undergo only slight modifications of their optical properties can be provided by carefully selecting the layer sequences of both the lower and upper anti-reflection layers and preferably also of the barrier layer(s).

According to the invention the lower anti-reflection layer of the low-e and/or solar control coating comprises at least three essential partial layers, namely:

a base layer of an (oxi)nitride of aluminium on or near the glass pane, serving as a glass side diffusion barrier;

a middle layer of an oxide of Zn and Sn, serving to stabilize the coating during a heat treatment by providing a dense and thermally stable layer and to reduce the sheet resistance of the coating by improving the quality of the subsequently deposited silver-based functional layer, as compared to certain other known dielectric layers; and a top layer of a metal oxide, such as an oxide of Zn, optionally metal-doped, serving as a growth promoting layer for the silver-based functional layer deposited thereafter.

Surprisingly this at least triple layer lower anti-reflection layer provides a superior quality to the low-e coating as compared to, e.g., known double layer lower anti-reflection layers such as "AlN/ZnO" or "Zn—Sn oxide/ZnO".

Furthermore according to the invention the upper anti-reflection layer comprises a layer of an (oxi)nitride of aluminium having a thickness of more than 10 nm.

The layer of an (oxi)nitride of aluminium, which makes up a major part of the upper anti-reflection layer, provides stability and diffusion barrier properties. The layer of an (oxi)nitride of aluminium of the upper anti-reflection layer is preferably in contact with the barrier layer as defined herein without any intervening further dielectric layer. With its thickness of more than 10 nm it provides an excellent barrier function. It may in principle make up the whole upper anti-reflection layer. As layers of (oxi)nitride of aluminium may however be somewhat prone to scratching it is preferred to add a thin outermost protective layer to improve the scratch resistance of the coating.

While a number of materials, particularly of metal oxides, are generally known in the art to be usable for scratch protective outermost layers, it is particularly preferred that the outermost protective layer consists of an oxide of Zn and Sn comprising about 10-90 wt. % Zn and 90-10 wt. % Sn, preferably 40-60 wt. % Zn and 40-60 wt. % Sn (in wt. % of the total metal content).

The lower anti-reflection layer comprises a base layer of an (oxi)nitride of aluminium. The term "(oxi)nitride of aluminium" encompasses both Al nitride (AlN) and Al oxinitride ($AlO_xN_y$). Layers of (oxi)nitride of aluminium may be sputtered from Al targets in a sputtering atmosphere containing nitrogen and argon. An oxygen content of the aluminium (oxi)nitride layer may result from residual oxygen in the sputtering atmosphere or from a controlled content of added oxygen in said atmosphere. It is generally preferred if the oxygen content of the aluminium (oxi)nitride is significantly lower than its nitrogen content, i.e. if the atomic ratio O/N in the layer is kept significantly below 1. It is most preferred to use Al nitride with negligible oxygen content for the base layer of the lower anti-reflection layer. The oxygen content is regarded as negligible if the refractive index of the layer does not differ significantly from the refractive index of a pure Al nitride layer.

It is within the scope of the invention to use doped or mixed Al targets or to otherwise add metals or semiconductors to the Al component of this layer as long as the essential barrier and protection property of the base layer of the lower anti-reflection layer is not lost. Such doping may for example result from the use of certain technical Al alloys as target materials which typically contain metal or semiconductor additives such as Cu, Mg, Ti, Si or the like in amounts of up to about 5-10 wt. %.

A further dielectric layer may be provided in the lower anti-reflection layer, particularly arranged immediately on the glass substrate and below the base layer of an (oxi)nitride of aluminium, e.g. a layer having a high refractive index. A dielectric material having a refractive index at 550 nm of at least about 2.2, more preferably of at least about 2.3, is particularly recommended for such purpose. A particularly suitable material for such additional dielectric layer is an oxide of titanium ($TiO_2$). It is particularly preferred to use a medium-frequency-sputtered oxide of titanium for such additional dielectric layer and it is preferred to deposit the titanium oxide layer in a sputtering atmosphere to which no nitrogen is added. Other suitable materials are, e.g., the oxides of Nb, Zr and/or Hf.

By such additional layer the optical properties of the coating may be further optimised as is well known in the art, i.e., a particularly high light transmittance and low IR transmittance at neutral colours may be achievable. If however a particularly good stability of the coating during a heat treatment and/or a superior mechanical and chemical resistance of the coating are aimed at it is preferred to arrange the base layer of an (oxi)nitride of aluminium immediately on the glass substrate.

The middle layer of the lower anti-reflection layer preferably comprises about 10-90 wt. % Zn and 90-10 wt. % Sn, more preferably about 40-60 wt. % Zn and about 40-60 wt. % Sn (in wt. % of its total metal content).

The thickness of the middle layer of the lower anti-reflection layer should be at least about 5 nm to contribute significantly to improving the sheet resistance of the subsequently deposited silver-based functional layer, an upper thickness limit of about 25 nm being mainly given by optical interference conditions. A typical and preferred thickness range is about 10-20 nm.

The top layer of the lower anti-reflection layer primarily functions as a growth promoting layer for the subsequently deposited silver-based functional layer. It is preferred if this layer comprises an oxide of Zn, optionally doped with metals like Al or Sn in an amount of up to about 10 wt. %, Al being actually preferred as a Zn dopant. ZnO has proven very effective as growth promoting layer which assists in achieving a low sheet resistance at a given thickness of the subsequent silver-based functional layer. Alternatively an oxide of In or of an In-based alloy, e.g. In—Sn oxide (ITO), may be used as the top layer of the lower anti-reflection layer. In this case it is preferred if the top layer is reactively deposited from a metallic target.

It is within the scope of the invention to insert a very thin primer layer between the top layer of the lower anti-reflection layer and the silver-based functional layer, e.g., to combine the aforementioned ZnO-based growth-promoting layer with a further very thin oxidic layer having a thickness of no more than about 1 nm. The further oxidic layer may preferably be chosen from stoichiometric or substoichiometric ITO, $NiCrO_x$ or $ZrO_x$, stoichiometric or substoichiometric $NiCrO_x$ being particularly preferred. The oxidic layer shall be essentially stoichiometric if a coating having stable optical properties is aimed at.

Such primer layer may furthermore be applied below any additional silver-based functional layer of a double or multiple silver coating.

The overall thicknesses of both the lower and upper anti-reflection layers as well as of any central anti-reflection layer located between two silver-based functional layers are chosen, as is well known in the art, such that they can serve their basic function of anti-reflecting the silver-based functional layer(s) by optical interference and provide the coated glass pane with a pleasing appearance or with a desired colour in reflection or transmission. To achieve the desired anti-reflection property each lower and upper anti-reflection layer will typically have a total geometrical thickness of about 20-60 nm, whereas the thickness of central anti-reflection layers is typically about twice as large.

In these boundaries the thickness of the individual partial layers of the lower anti-reflection layer can be varied widely. It is however preferred, if
  the base layer of the lower anti-reflection layer has a thickness of at least about 8 nm, more preferably of about 12-30 nm, even more preferably of about 12-25 nm;
  the middle layer of the lower anti-reflection layer has a thickness of at least about 5 nm, preferably of about 5-25 nm; and
  the top layer of the lower anti-reflection layer has a thickness of at least about 2 nm, preferably of about 2-10 nm.

Any silver-based functional layer will usually consist only of silver without any additive, as is normally the case in the area of low-e and/or solar control coatings. It is, however, within the scope of the invention to modify the properties of the silver-based functional layer(s) by adding doping agents, alloy additives or the like or even add very thin metal or metal compound layers, as long as the properties of the silver-based functional layer(s) necessary for its/their function as highly light-transmitting and low light-absorbent IR-reflective layer are not substantially impaired thereby.

The thickness of the silver-based functional layer(s) is dominated by its technical purpose. For typical low-e and/or solar control purposes its preferred thickness is about 8-15 nm and more specifically about 9-12 nm. With such a layer thickness light transmittance values of above 85% and a normal emissivity below 0.05 after a heat treatment can be easily achieved (single silver coatings). If better solar control properties are aimed at the thickness of the silver-based functional layer(s) may be adequately increased.

The barrier layer(s) of the inventive coating may generally comprise metals or metal alloys or certain metal compounds such as their (oxi)nitrides or suboxides. Ti, NiCr, $TiO_x$, $NiCrO_x$, $NiCrN_x$, $InSnO_x$, $NiCrO_x$ are particularly preferred. Such materials are well known in the art to be able to protect a silver layer during the deposition of a subsequent anti-reflection layer and during a heat treatment of the coated glass pane.

If however the coated glass pane shall not only be heat treatable but is intended to undergo only a negligible colour and light transmittance modification during a heat treatment, barrier layers comprising essentially fully oxidized, at most slightly substoichiometric metal oxides are preferred. The use of a metal oxide barrier layer rather than a metallic or suboxidic barrier layer leads to an extremely high optical stability of the coating during a heat treatment and effectively assists in keeping optical modifications during a heat treatment small. Surprisingly the good barrier and protective properties of the upper and lower anti-reflection layers according to the invention allow to avoid the use of known oxygen scavenger materials like metals or metal suboxides. While these oxygen scavenger materials usually protect the silver-based functional layer effectively against damage, their oxidization during a heat treatment will lead to a significant increase of the light transmittance and a clearly visible colour modification of the coated glass pane during such heat treatment.

It has been found that a superior protection of the silver-based functional layer during the deposition process and a high optical stability during a heat treatment can be achieved if the barrier layer comprises a layer of a (doped) metal oxide sputtered from a (doped) metal oxide target.

Good results are specifically achieved if the barrier layer comprises an Al-doped oxide of Zn (ZnO:Al), specifically if sputtered from a conductive ZnO:Al target. ZnO:Al may be deposited fully oxidized or such that it is slightly suboxidic. Surprisingly it has been found that a very low oxygen deficit in the ZnO:Al layer is well-suited which is so low that it does not lead to a noticeable light absorption effect by the barrier layer even for the non-heat treated coated glass pane, e.g. reduces the light transmittance of the coated glass pane via absorption by no more than about 1%. The use of such a low light-absorbing barrier layer advantageously leads only to a slight light transmittance increase during a heat treatment.

The barrier layer may comprise an oxide of titanium, preferably an oxide of titanium sputtered from a conductive oxide target. The oxide of titanium may be deposited as a slightly substoichiometric layer.

Another alternative is the use of indium oxide or an oxide of an indium-based alloy like In—Sn oxide (ITO), also optionally deposited slightly substoichiometric, the In or In-based alloy oxides also preferably being sputtered from oxide targets.

The adherence of an oxidic barrier layer to the silver-based functional layer may be increased if the layer has a graded composition, the barrier layer being preferably more metallic near the silver-based functional layer than at its outer surface.

In a preferred embodiment of the invention a multiple layer barrier layer is provided which comprises in combination a suboxidic metal oxide barrier layer of, e.g., $NiCrO_x$ immediately above the silver-based functional layer and a subsequent (metal doped) metal oxide barrier layer such as, e.g., Al-doped ZnO.

The targets of an Al-doped oxide of Zn, of titanium oxide and of In oxide or of an In-based alloy oxide mentioned before may be at least slightly suboxidic to increase their electrical conductivity and to simplify the sputter deposition process for the—optionally slightly suboxidic—Al-doped zinc oxide ($ZnO_x$:Al), titanium oxide or In or In-based alloy oxide barrier layers. While sputtering in a coating atmosphere containing a controlled small amount of added oxygen may be appropriate, it is preferred if the coating atmosphere contains only a minimum amount of oxygen. An extremely low oxygen content of the coating atmosphere may be achieved by pre-sputtering the targets to provide clean and well-defined target surfaces before starting the actual deposition process, by pumping for a sufficiently long period to evacuate the sputter chamber to a very low pressure of residual gases and specifically by depositing the layers in a sputtering atmosphere to which only inert gases such as argon have been added.

To provide a sufficient protection for the silver-based functional layer(s) barrier layer(s) if deposited as a metal oxide should have a thickness of at least about 1 nm, preferably at least about 2 nm. While the upper thickness limit is less critical it is preferred to use a barrier layer with a thickness of less than about 15 nm and preferably up to 10 nm. If metal or metal suboxide barrier layers are used even a lower thickness than about 3 nm may be sufficient, e.g. a thickness of at least about 0.5 nm and preferably at most about 2 nm, at least if a high light transmittance and/or a high stability of the coating during a heat treatment are aimed at.

Coated glass panes with a low-e and/or solar control coating according to the invention—if properly designed and comprising a single silver-based functional layer—may achieve a light transmittance $T_L$ of at least about 86% before a heat treatment. The light transmittance after a heat treatment will mostly be somewhat higher than the light transmittance before such heat treatment. Therefore heat treated coated glass panes according to the invention may achieve a light transmittance $T_L$ of at least about 89%. Coated glass panes produced in accordance with certain embodiments of the invention, e.g. wherein metallic or suboxidic layers are avoided or are used at a very low thickness and wherein a single silver-based functional layer is used, may show an increase $\Delta T_L$ of their light transmittance during a heat treatment of at most about 2.5%.

Light transmittance values referred to in the description and in the claims are generally specified with reference to a coated glass pane comprising a 4 mm thick standard float glass pane having a light transmittance $T_L$ of 89% without a coating.

Coated glass panes according to the invention comprising a single silver-based functional layer may have a normal emissivity of at most about 0.07, more preferably of at most about 0.05 (before a heat treatment), corresponding to a sheet resistance of at most about 6Ω/□. Due to a heat treatment the emissivity of the inventive coatings is typically reduced by at least about 0.01 or even more, without such reduction having a significant influence on the visual appearance of the coated glass panes. Such heat treated coated glass panes preferably have a normal emissivity of at most about 0.05, preferably at most about 0.04, corresponding to a sheet resistance of below 4Ω/□. A reduction of the emissivity during a heat treatment reflects a reduction of the correlated sheet resistance of the coating which indicates that the silver-based functional layer survives the heat treatment without major damage. Indeed it is usually found that a heat treatment increases the free electron mobility in silver-based functional layers if they are efficiently protected against heat-caused damage.

Double or multiple silver coatings may achieve even lower emissivity and sheet resistance values.

While a neutral reflection and transmission colour of the coated glass panes is usually aimed at, the colour of the coated glass panes according to the invention may be varied widely according to the intended visual appearance of the product.

Coated glass panes according to the invention may be used as such if no heat treatment is required. One major advantage of coated glass panes according to certain embodiments of the invention consists in the fact that due to their thermal stability non-heat treated and heat treated coated glass panes may be used in the same building and glazed adjacent to each other without a noticeable colour difference.

The colour and light transmittance stability of the inventive coated glass panes is reflected by the fact that heat treated coated glass pane according to certain preferred embodiments of the invention—comprising a single silver-based functional layer—display a $\Delta E^*$ value (with reference to an identical non-heated coated glass pane and as defined herein below) below about 2.5 in reflection (film side), below about 2 in reflection (glass side) and below about 1.5 in transmission. Specifically the colour stability of certain embodiments of the invention may be extremely high, $\Delta a^*$ and $\Delta b^*$ each remaining below about ±1 in transmission which is practically non-noticeable.

The thermal stability of coated glass panes according to the invention is reflected by the fact that the haze value of heat treated coated glass panes remains significantly below about 0.5%, most often even below about 0.2% and preferably even below 0.1%. Larger increases in the haze value if detected during a heat treatment would indicate that the coating is beginning to be damaged.

It goes without saying that coated glass panes according to the invention will not necessarily survive without damage more than one heat treatment and that all comparison values before and after heat treatment refer to a comparison between a non-heat treated coated glass pane and a coated glass pane heat treated once. Needless to say that heat treated coated glass panes may need to survive subsequent thermal treatments at significantly lower temperatures, such as those applied during heat soak tests (usually applied to artificially age and thereby destroy NiS-containing toughened glass panes) which are typically in the order of 300° C.

To minimize any light absorption in the coating and to reduce the light transmittance increase during a heat treatment the individual layers of the upper and lower anti-reflection layers should be deposited with an essentially stoichiometric composition. If however the optical stability or a high light transmittance is not of primary concern a certain degree of substoichiometry may be acceptable for one or more of the layers of the inventive coating.

To further optimize the optical properties of the coating the upper and/or lower anti-reflection layers layer may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al. It is particularly within the scope of the invention to combine the Al (oxi)nitride base layer of the lower anti-reflection layer or the Al (oxi)nitride layer of the upper anti-reflection layer with a Si (oxi)nitride layer. By such combination whereby Al (oxi)nitride is effectively partially replaced by Si (oxi)nitride productivity may be increased. Care should however be taken to maintain the minimum layer thicknesses for both Al (oxi)nitride layers as indicated herein.

It will be appreciated that these further partial layers may contain additives which modify their properties and/or facilitate their manufacture, e.g. doping agents or reaction products of reactive sputtering gases. In the case of oxide layers nitrogen may be added to the sputtering atmosphere leading to the formation of oxinitrides rather than oxides.

In certain cases, e.g., if a particularly low solar energy transmittance is aimed at, it may be desirable for one or both of the anti-reflection layers to comprise additionally one or more thermally stable light and/or solar energy absorbing layer(s). Alternatively or in addition hereto the barrier layer may be designed as light and/or solar energy absorbing layer.

To protect such visible light absorbing layer against undesired oxidization during a heat treatment it is preferred if the light and/or solar energy absorbing layer is embedded in one of the Al (oxi)nitride layers, preferably the Al (oxi)nitride of the upper anti-reflection layer of the coating which for such purpose is split into (at least) two partial layers of an (oxi)nitride of Al. Here advantage is taken of the fact that an (oxi)nitride of Al provides of good oxygen diffusion barrier properties which leads to an effective protection of the embedded oxidizable layer by the embedding partial layers of Al (oxi)nitride.

Care must be taken by performing a proper material, structure and thickness selection when adding any partial layer to the basic layer sequence of the inventive coating that the properties primarily aimed at, e.g. a high thermal stability, are not significantly impaired.

While the invention is primarily directed to low-e and/or solar control coatings with only one silver-based functional layer it is within the scope of the invention to apply the inventive concept to low-e and/or solar control coatings comprising two or even more silver-based functional layers. By providing more than one silver-based functional layer, all functional layers are spaced by intervening dielectric layers to form a Fabry-Perot interference filter, whereby the optical properties of the low-e and/or solar control coating may be further optimized for the respective application as is well known in the art. In these cases preferably each additional central anti-reflection layer located between two silver-based functional layers comprises—in sequence from the lower functional layer—a layer of an (oxi)nitride of aluminium, optionally a layer of an (oxi)nitride of silicon, optionally a further layer of an (oxi)nitride of aluminium, a layer of an oxide of Zn and Sn, and a layer of a metal oxide, preferably of a (metal-doped, e.g. Al-doped) zinc oxide.

Below each silver-based functional layer a growth promoting top layer such as explained herein before shall preferably be arranged. Above each silver-based functional layer a barrier layer such as described herein before shall be arranged.

The invention is not limited to a specific production process for the coating. However, it is particularly preferred if at least one of the layers and most preferred all layers are applied by magnetron cathode sputtering, either in the DC mode, in the medium frequency mode or in any other suitable mode, whereby metallic or semiconducting targets are sputtered reactively or non-reactively in a suitable sputtering atmosphere. Depending on the materials to be sputtered planar or rotating tubular targets may be used.

The coating process is preferably carried out by setting up suitable coating conditions such that any oxygen deficit of any oxide layer of the coating is kept low to achieve a high stability of the light transmittance and colour of the coated glass panes during a heat treatment.

The process parameters for the manufacture of inventive heat treatable coated glass panes and the thicknesses and materials of the individual layers are chosen such that in the case of single silver-based functional layers—at least in those embodiments featuring a particularly high optical stability—during a subsequent heat treatment the surface resistance of the coating decreases and the light transmittance of the coated glass pane does not change by more than about 2.5%.

In any case the deposition shall be performed such that the haze value of the coated glass pane does not exceed about 0.5%, preferably remains below about 0.2% and even more preferably remains below 0.1% after a heat treatment.

Particularly high quality coatings can be achieved if at least one of the partial layers of the lower anti-reflection layer is medium-frequency sputtered from metal or metal oxide targets. Medium-frequency sputtering is well known in the art of sputter deposition and encompasses AC sputtering of two or more targets at a frequency in the range of about 5-200 kHz.

The invention is further explained in the following with the aid of examples.

For all examples the coatings were deposited on 4 mm thick standard float glass panes with a light transmittance of about 89% using conventional AC and/or DC magnetron sputtering devices, medium-frequency sputtering being applied where appropriate.

All dielectric layers of an oxide of Zn and Sn ($ZnSnO_x$, weight ratio Zn:Sn≈50:50) were reactively sputtered from zinc-tin targets in an $Ar/O_2$ sputter atmosphere.

The ZnO growth promoting top layers of the lower anti-reflection layers were sputtered from Zn targets in an $Ar/O_2$ sputter atmosphere.

The functional layer which in all examples consisted of pure silver (Ag) was sputtered from silver targets in an Ar sputter atmosphere without any added oxygen and at a partial pressure of residual oxygen below $10^{-5}$ mbar.

The barrier layers of (slightly substoichiometric, low light absorbing) Al-doped zinc oxide (ZnO:Al) were sputtered from conductive $ZnO_x$:Al targets in a pure Ar sputter atmosphere without added oxygen. In the case of a $TiO_x$ barrier layer the deposition process would preferably have been controlled such that the oxygen content of the layer increased from the silver layer outwards.

The base layer of the lower anti-reflection layers and the main layer of the outer anti-reflection layers of aluminium nitride ($AlN_x$) were each reactively sputtered from an Al target in an $Ar/N_2$ sputter atmosphere containing only residual oxygen.

The layers of silicon nitride ($SiN_x$) were reactively sputtered from an Al-doped Si target in an $Ar/N_2$ sputter atmosphere containing only residual oxygen.

EXAMPLES 1-4

One Functional Silver Layer

The coatings of examples 1-4 had the layer sequences as shown in Table 1 (all thicknesses in nm):

TABLE 1

| | base layer of lower AR layer | middle layer of lower AR layer | top layer of lower AR layer | functional layer | barrier layer | main layer of upper AR layer | outermost protective layer |
|---|---|---|---|---|---|---|---|
| Ex. 1 | $AlN_x$ 15 | $ZnSnO_x$ 13.5 | ZnO 3 | Ag 10 | ZnO:Al 2.5 | $AlN_x$ 32 | $ZnSnO_x$ 5 |
| Ex. 2 | $AlN_x$ 15 | $ZnSnO_x$ 13.5 | ZnO 3/ $NiCrO_x$ 0.5 | Ag 10 | ZnO:Al 2.5 | $AlN_x$ 32 | $ZnSnO_x$ 5 |
| Ex. 3 | $AlN_x$ 15 | $ZnSnO_x$ 13.5 | ZnO 3 | Ag 10 | ZnO:Al 2.5 | $AlN_x$ 15/ $SiN_x$ 15 | $ZnSnO_x$ 5 |
| Ex. 4 | $AlN_x$ 15 | $ZnSnO_x$ 13.5 | ZnO 3 | Ag 10 | $NiCrO_x$ 0.5/ ZnO:Al 2.5 | $AlN_x$ 32 | $ZnSnO_x$ 5 |

Example 1 represents a basic layer sequence; example 2 comprises an additional thin suboxidic $NiCrO_x$ primer layer below the silver layer; in example 3 the Al nitride layer of the outer anti-reflection layer is partially replaced by a silicon nitride layer; in example 4 the barrier layer comprises an additional very thin suboxidic $NiCrO_x$ layer immediately above the silver functional layer. All example coatings comprised an outermost protective layer of $ZnSnO_x$ with a thickness of about 5 nm to increase their scratch resistance.

Immediately after the deposition of the coatings of examples 1-4 the optical and some other properties of the coated glass panes were determined (values "before HT"). The samples were then heat treated at about 650° C. for about 5 minutes. Thereafter the properties referred to above were measured again (values "after HT"). The results are listed in Tables 2 and 3 below.

The values stated for the light transmittance $T_L$ of the coated glass panes in the examples 1-4 were derived from measurements according to EN 140. The sheet resistance was measured using a NAGY SRM-12 non-contact sheet resistance meter.

The haze values designate the percentage of transmitted light which in passing through the coated glass pane deviates from the incident beam direction by forward scattering (measured in accordance with ASTM D 1003-61). A haze value which remains low during a heat treatment is a good indicator for heat treatability.

The colour characteristics were measured and reported using the well established CIE LAB L*, a*, b* coordinates (see e.g. [0030] and [0031] in WO 2004-063 111 A1). $\Delta E^* = ((\Delta a^*)^2 + (\Delta b^*)^2 + (\Delta L^*)^2)^{1/2}$, wherein $\Delta L^*$, $\Delta a^*$ and $\Delta b^*$ are the differences of the colour values L*, a*, b* of the coated glass pane each before and after a heat treatment. $\Delta E^*$ values of less than 3 represent a low and practically non-noticeable colour modification caused by the heat treatment.

TABLE 2

| | Haze before HT [%] | Haze after HT [%] | Sheet resistance $R_\square$ before HT [Ω/sq.] | Sheet resistance $R_\square$ after HT [Ω/sq.] | $\Delta R_\square$ [Ω/sq.] | $T_L$ before HT [%] | $T_L$ after HT [%] | $\Delta T_L$ [%] |
|---|---|---|---|---|---|---|---|---|
| Ex. 1 | 0.05 | 0.08 | 6.00 | 3.21 | −2.79 | 87.32 | 89.05 | 1.73 |
| Ex. 2 | 0.05 | 0.09 | 5.10 | 2.94 | −2.16 | 86.99 | 89.04 | 2.05 |
| Ex. 3 | 0.05 | 0.08 | 5.80 | 3.33 | −2.47 | 86.82 | 89.04 | 2.22 |
| Ex. 4 | 0.05 | 0.09 | 5.70 | 3.13 | −2.57 | 83.34 | 85.42 | 2.08 |

All coatings of the examples 1-4 performed well in terms of haze (which remained below 0.1%), sheet resistance decrease (down to values of about 3-4 Ω/sq., corresponding to normal emissivities of well below about 0.05) and light transmittance increase ($\Delta T_L$ below 2.5%).

TABLE 3

| | Transm. colour before HT (a*/b*) | Transm. colour after HT (a*/b*) | $\Delta E^*$ Trans | Refl. colour film side before HT (a*/b*) | Refl. colour film side after HT (a*/b*) | $\Delta E^*$ Refl. film side | Refl. colour glass side before HT (a*/b*) | Refl. colour glass side after HT (a*/b*) | $\Delta E^*$ Refl. glass side |
|---|---|---|---|---|---|---|---|---|---|
| Ex. 1 | −1.82/1.04 | −1.57/1.52 | 0.90 | −0.05/−7.45 | −0.03/−9.19 | 1.76 | −0.27/−8.59 | −0.49/−8.91 | 0.44 |
| Ex. 2 | −2.32/0.72 | −2.08/1.21 | 1.01 | 3.92/−5.54 | 3.70/−7.89 | 2.45 | 2.69/−7.45 | 2.90/−8.38 | 0.96 |
| Ex. 3 | −1.78/0.78 | −1.64/1.30 | 1.08 | 0.76/−5.87 | 1.10/−7.88 | 2.18 | 0.72/−8.32 | 0.96/−8.69 | 0.46 |
| Ex. 4 | −3.02/2.58 | −3.18/2.32 | 0.95 | 4.86/−13.41 | 5.73/−11.21 | 2.37 | 2.19/−11.31 | 3.30/−9.84 | 1.86 |

All coatings of the examples 1-4 performed also well in terms of ΔE*, ΔE* being less than 2.5 in reflection (film side), less than 2 in reflection (glass side) and less than 1.5 in transmission.

In addition to the quantitative properties given in the tables above the visual appearance of the coated samples before and after the heat treatment was evaluated using an internal evaluation system on a perfectness scale of 0 (perfect, no faults) to 3 (high number of clearly visible faults). The internal evaluation system considers both the microscopic light scattering effect of the coating (haze, see Table 2) and the more macroscopic effect of visible faults in the coating which cause local colour variations where the coating is damaged or imperfect. All examples showed a reasonably low number of faults (perfectness value 0-1) before the heat treatment. The inventive coatings of examples 1-4 showed no substantially increased amount of faults after the heat treatment.

Similar coatings which used $SiN_x$ layers in place of the $AlN_x$ layers were visibly damaged by the appearance of a non-negligible number of visible large spots (perfectness value 3) after the heat treatment and its red haze value ("red haze" relates to a scattering effect which gets visible if a coating is illuminated with bright light before a dark background, simulating the scattering effect that takes place in the coating at sunrise or sunset) was high making these coatings unacceptable for commercial purposes.

The coated glass panes of examples 1-4 not only proved to be heat treatable but also survived a number of tests simulating ordinary environmental influences during storage, transport and use of the coated glass panes both before and after a heat treatment. The tests comprised specifically a Taber test, a humidity test, an HCl test and an oil rub test.

A Taber test provides a measure of the relative scratch resistance of coated glass panes. The test consists in placing the coated glass samples on a Taber abrader and to subject them to 10 revolutions with a standard 500 g weight. Then by microscopy, image and data analysis the average area of the non-abraded coating is determined. The harder the coating is the more of the coating remains on the glass.

A humidity test is an accelerated test that is carried out in a cabinet simulating the environmental influences the coating is expected to experience during its lifetime. The purpose of this test is to determine the relative durability of the coating when subjected to high temperature and high humidity conditions. The test involves visual analysis (monitor the development of characteristic corrosion spots) of the coated glass panes before and after a period of 30 hours in the test cabinet held at 70° C. and 75% relative humidity.

The purpose of an HCl test is to assess the chemical durability of the coatings. The coated glass panes are submerged in a 0.01M solution of hydrochloric acid at 40° C. for five minutes. The sheet resistance of the coating before and after submerging the sample is determined. The HCl test is regarded as passed if the change in sheet resistance is below 5%.

An oil rub test serves to simulate the influence of cutting oils used for cutting glass panes on the mechanical robustness of a coating. Coated glass panes which do not withstand an oil rub test before or after a heat treatment will be difficult to process and are unsuitable for most practical applications. The coated samples are rubbed using a felt pad with an area of 1.5 cm² soaked in microscope oil. The samples are subjected to 500 cycles with a 15 N load at a speed of 37 cycles per minute. Oil rubbed samples are evaluated using an internal evaluation system on a perfectness scale of 0 (perfect, no damage) to 3 (silver layer completely removed). A score of 1 or less is considered acceptable.

EXAMPLES 5-6

Two Functional Silver Layers

The following two examples relate to low-e/solar control coatings comprising two silver layers and incorporating the essential features of the invention. The coatings of examples 5-6 had the layer sequences as shown in Table 4 (all thicknesses in nm):

TABLE 4

|  | base/middle layer of lower AR layer | top layer of lower AR layer | first funct. layer | first barrier layer | central AR layer | second funct. layer | second barrier layer | outer AR layer and outermost prot. layer |
|---|---|---|---|---|---|---|---|---|
| Ex. 5 | $AlN_x$ 15/ $ZnSnO_x$ 13.5 | ZnO 3 | Ag 10 | ZnO:Al 2.5 | $AlN_x$ 50/ $ZnSnO_x$ 10/ ZnO:Al 3 | Ag 10 | ZnO:Al 2.5 | $AlN_x$ 32/ $ZnSnO_x$ 5 |
| Ex. 6 | $AlN_x$ 15/ $ZnSnO_x$ 13.5 | ZnO 3 | Ag 10 | ZnO:Al 2.5 | $AlN_x$ 10/ $SiN_x$ 40/ $AlN_x$ 10/ ZnO:Al 3 | Ag 10 | ZnO:Al 2.5 | $AlN_x$ 32/ $ZnSnO_x$ 5 |

Example 5 represents a basic layer sequence similar to example 1 wherein all anti-reflection layers including the central anti-reflection layer comprise a sequence "Al nitride/oxide of Zn and Sn"; in example 6 the central anti-reflection layer comprises a sequence "Al nitride/Si nitride/Al nitride".

Immediately after the deposition of the coatings of examples 5-6 the optical and some other properties of the coated glass panes were measured (values "before HT"). The samples were then heat treated at about 650° C. for about 5 minutes. Thereafter the properties referred to above were measured again (values "after HT"). The results are listed in Tables 5 and 6 below. The measurements and calculations were performed as described above for examples 1-4.

TABLE 5

|  | Haze before HT [%] | Haze after HT [%] | Sheet resistance before HT [Ω/sq.] | Sheet resistance after HT [Ω/sq.] | ΔR☐ [Ω/sq.] | $T_L$ before HT [%] | $T_L$ after HT [%] | $\Delta T_L$ [%] |
|---|---|---|---|---|---|---|---|---|
| Ex. 5 | 0.05 | 0.09 | 2.55 | 1.51 | 1.04 | 79.46 | 83.88 | 4.42 |
| Ex. 6 | 0.05 | 0.09 | 2.50 | 1.56 | 0.94 | 79.31 | 84.07 | 4.76 |

The coatings of the examples 5-6 performed well in terms of haze (which remained below 0.1%) and sheet resistance decrease (down to extremely low values of about 1.5 Ω/sq. corresponding to a normal emissivity of about 0.02).

TABLE 6

|  | Transm. colour before HT (a*/b*) | Transm. colour after HT (a*/b*) | ΔE* Trans | Refl. colour film side before HT (a*/b*) | Refl. colour film side after HT (a*/b*) | ΔE* Refl. film side | Refl. colour glass side before HT (a*/b*) | Refl. colour glass side after HT (a*/b*) | ΔE* Refl. glass side |
|---|---|---|---|---|---|---|---|---|---|
| Ex. 5 | -2.45/-0.26 | -1.76/0.49 | 2.20 | -7.17/-3.78 | -8.34/-0.12 | 3.96 | -4.03/1.27 | -5.02/1.45 | 1.01 |
| Ex. 6 | -3.01/-0.92 | -2.78/-0.87 | 2.11 | -3.18/-3.65 | -0.23/-1.17 | 4.63 | -0.26/2.02 | 1.41/1.73 | 1.78 |

The coatings of the examples 5-6 performed well in terms of ΔE* in transmission and in glass side reflection, ΔE* being less than 5 in reflection (film side), less than 2 in reflection (glass side) and less than 2.5 in transmission.

Needless to say that the invention is not restricted to the exact layer sequences of the examples 1-6.

It is particularly within the scope of the invention to add further layers to the basic layer sequences used in the examples such as described herein before.

It is furthermore within the scope of the invention to modify the materials used for the individual layers, e.g. by doping or other additives, as long as the primary task of providing heat treatable coatings is not impaired thereby.

It will be appreciated that any thickness values given for the layers of the coating are not to be understood as exact values but due to the thinness of the layers to be presented with an uncertainty of typically about 10%, not less than about 0.5 nm.

Finally more complex coatings using more than one silver-based functional layer may be easily derived from the principal teaching disclosed above.

The invention claimed is:

1. A heat treatable coated glass pane with a low-e and/or solar control coating comprising—in sequence from the glass surface—at least the following layers:
   a lower anti-reflection layer, comprising
      a base layer of an (oxi)nitride of aluminium in contact with
      a middle layer of an oxide of Zn and Sn, and
      a top layer of an oxide of zinc;
   a silver-based functional layer;
   a barrier layer of an oxide or suboxide of NiCrOx; and
   an upper anti-reflection layer comprising a layer of an (oxi)nitride of aluminium having a thickness of more than 10 nm and an outermost protective layer that comprises 10-90 wt. % Zn and 90-10 wt. % Sn in wt. % of the total metal content,
   wherein the barrier layer is in contact with the layer of an (oxi)nitride of aluminium of the upper anti-reflection layer, which is in turn in contact with the outermost protective layer.

2. The coated glass pane according to claim 1, wherein the middle layer of the lower anti-reflection layer has a thickness of 5-25 nm.

3. The coated glass pane according to claim 1, wherein the outermost protective layer of the upper anti-reflection layer has a thickness of 2-10 nm.

4. The coated glass pane according to claim 1, wherein the base layer of the lower anti-reflection layer has a thickness of at least 8 nm.

5. The coated glass pane according to claim 1, wherein the base layer of the lower anti-reflection layer has a thickness of 12-25 nm.

6. The coated glass pane according to claim 1, wherein the top layer of the lower anti-reflection layer has a thickness of 2-10 nm.

7. The coated glass pane according to claim 1, wherein the barrier layer has a thickness of 1-10 nm.

8. The coated glass pane according to claim 1, wherein the barrier layer has a thickness of at most 2 nm.

9. The coated glass pane according to claim 1, wherein the coating comprises—in sequence—the following layers: glass pane/base layer of $AlN_x$ 8-25 nm/middle layer of $ZnSnO_x$ 5-25 nm/top layer of ZnO, optionally metal-doped, 2-10 nm/optional primer layer ≦1 nm/functional layer of Ag 8-15 nm/optional metallic or suboxidic barrier layer ≦2 nm/barrier layer of ZnO:Al 1-10 nm/layer of $AlN_x$ 15-40 nm/optional outermost protective layer of $ZnSnO_x$ 2-10 nm.

10. The coated glass pane according to claim 1, wherein the top layer of the lower anti-reflection layer comprises a metal-doped oxide of Zn.

11. The coated glass pane according to claim 10, wherein the top layer of the lower anti-reflection layer comprises an oxide of Al-doped Zn.

12. The coated glass pane according to claim 1, wherein the coating comprises a light and/or solar energy absorbing layer, comprised of a material and being arranged such that it remains light and/or solar energy absorbing after a heat treatment.

13. The coated glass pane according to claim 12, wherein the barrier layer comprises a light and/or solar energy absorbing layer.

14. The coated glass pane according to claim 12, wherein the light and/or solar energy absorbing layer is embedded in one of the layers of an (oxi)nitride of aluminium.

15. The coated glass pane according to claim 12, wherein the light and/or solar energy absorbing layer comprises a metal or a metal nitride.

16. The coated glass pane according to claim 15, wherein the metal or metal nitride comprises NiCr, W or their nitrides.

17. The coated glass pane with a low-e and/or solar control coating according to claim 1, further comprising:
   a central anti-reflection layer over the barrier layer;
   a second silver-based functional layer the central anti-reflection layer; and
   a second barrier layer between the second silver-based functional layer and the upper anti-reflection layer.

18. The coated glass pane according to claim 17, wherein the central anti-reflection layer comprises—in sequence from the first barrier layer—a layer of an (oxi)nitride of aluminium, optionally a layer of an (oxi)nitride of silicon, optionally a further layer of an (oxi)nitride of aluminium, a layer of an oxide of Zn and Sn, and a layer of a metal oxide.

19. The coated glass pane according to claim 18, wherein said layer of a metal oxide comprises an oxide of Zn, optionally metal-doped.

20. The coated glass pane according to claim 18, wherein said layer of a metal oxide comprises an Al-doped oxide of Zn.

* * * * *